(12) United States Patent
Nakamura et al.

(10) Patent No.: US 9,936,844 B2
(45) Date of Patent: Apr. 10, 2018

(54) SELF-PROPELLED ELECTRONIC DEVICE (71) Applicant: Sharp Kabushiki Kaisha, Osaka-shi, Osaka (JP)

(72) Inventors: Yasushi Nakamura, Osaka (JP); Koji Murakami, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 315 days.

(21) Appl. No.: 14/771,226

(22) PCT Filed: Feb. 17, 2014

(86) PCT No.: PCT/JP2014/053645
§ 371 (c)(1),
(2) Date: Aug. 28, 2015

(87) PCT Pub. No.: WO2014/192332
PCT Pub. Date: Dec. 4, 2014

(65) Prior Publication Data
US 2016/0015232 A1 Jan. 21, 2016

(30) Foreign Application Priority Data
May 30, 2013 (JP) .................................. 2013-114178

(51) Int. Cl.
*A47L 9/00* (2006.01)
*B60G 11/14* (2006.01)
*H01T 23/00* (2006.01)

(52) U.S. Cl.
CPC .............. *A47L 9/009* (2013.01); *B60G 11/14* (2013.01); *H01T 23/00* (2013.01);
(Continued)

(58) Field of Classification Search
CPC .............. A47L 9/0009; A47L 2201/00; A47L 2201/04; H01T 23/00; B60G 11/14; B60G 2201/12; Y10S 1/01
See application file for complete search history.

(56) References Cited

U.S. PATENT DOCUMENTS

| 8,763,200 B2 * | 7/2014 | Kim | ......................... A47L 9/009 15/319 |
| 9,033,079 B2 * | 5/2015 | Shin | ......................... B25J 5/007 180/65.6 |

(Continued)

FOREIGN PATENT DOCUMENTS

| JP | 2003-033310 A | 2/2003 |
| JP | 2012-125652 A | 7/2012 |
| JP | 2013-059624 A | 4/2013 |

OTHER PUBLICATIONS

Official Communication issued in International Patent Application No. PCT/JP2014/053645, dated May 20, 2014.

*Primary Examiner* — David Redding
(74) *Attorney, Agent, or Firm* — Keating & Bennett, LLP (57) ABSTRACT

Provided is a self-propelled electronic device in which performance for running over a level difference of a floor surface of a room is improved.

The self-propelled electronic device includes: a housing which has a bottom plate; a pair of right and left drive wheel units which support the housing; and a resilient member which resiliently urges the drive wheel units in a direction to project toward a lower side from the bottom plate, each of the drive wheel units having a drive wheel and a drive wheel holder which holds the drive wheel to be rotatable around a first shaft center, in which the drive wheel holder is attached to the housing so as to be rotatable around a second shaft center which is arranged further toward a rear side than the first shaft center and which is parallel to the first shaft center, and (Continued)

an urging force of the resilient member is applied to the drive wheel units such that a pressing force, which is exerted in a direction perpendicular to a straight line connecting the first shaft center and the second shaft center toward an outer periphery of the drive wheel from the first shaft center, is exerted further toward a front side in a traveling direction than toward a gravity direction of the housing.

5 Claims, 8 Drawing Sheets

(52) U.S. Cl.
CPC ....... *A47L 2201/00* (2013.01); *B60G 2202/12* (2013.01); *Y10S 901/01* (2013.01)

(56) References Cited

U.S. PATENT DOCUMENTS

| | | |
|---|---|---|
| 9,427,123 B2 * | 8/2016 | Vanderstegen-Drake ................ A47L 9/00 |
| 2013/0061420 A1 | 3/2013 | Vanderstegen-Drake et al. |

* cited by examiner

SELF-PROPELLED ELECTRONIC DEVICE

TECHNICAL FIELD

This invention relates to a self-propelled electronic device, and specifically relates to a self-propelled electronic device capable of traveling on a floor surface having a level difference.

BACKGROUND ART

As a self-propelled electronic device, PTL 1 proposes a self-propelled vacuum cleaner which is provided with a housing having a suction port in a lower surface, a pair of right and left drive wheels for supporting and propelling the housing, a main brush provided in the suction port so as to be rotatable, and a side brush (auxiliary brush) provided frontward of the main brush in the lower surface of the housing so as to be rotatable.

CITATION LIST

Patent Literature

PTL 1: Japanese Unexamined Patent Application Publication No. 2012-125652

SUMMARY OF INVENTION

Technical Problem

Such a self-propelled vacuum cleaner cleans a floor surface of a room while travelling, but in a case where there is a level difference of the floor surface, it becomes difficult to run over the level difference which is higher than a certain height. For example, in a case where a level difference between a floor surface and a carpet laid thereon, a level difference due to a doorsill partitioning rooms, a level difference due to flooring laid partially on a tatami mat, or the like is in a room, and the self-propelled vacuum cleaner has low performance for running over a level difference, the self-propelled vacuum cleaner avoids the level difference, so that cleaning of an area of a room beyond the level difference is not performed in some cases.

The invention has been made by considering the circumstances above and provides a self-propelled electronic device in which performance for running over a level difference of a floor surface is improved.

Solution to Problem

Thus, according to the invention, provided is a self-propelled electronic device, including: a housing which has a bottom plate; a pair of right and left drive wheel units which support the housing; and a resilient member which resiliently urges the drive wheel units in a direction to project toward a lower side from the bottom plate, each of the drive wheel units having a drive wheel and a drive wheel holder which holds the drive wheel to be rotatable around a first shaft center, in which the drive wheel holder is attached to the housing so as to be rotatable around a second shaft center which is arranged further toward a rear side than the first shaft center and which is parallel to the first shaft center, and an urging force of the resilient member is applied to the drive wheel units such that a pressing force, which is exerted in a direction perpendicular to a straight line connecting the first shaft center and the second shaft center toward an outer periphery of the drive wheel from the first shaft center, is exerted further toward a front side in a traveling direction than toward a gravity direction of the housing.

Advantageous Effects of Invention

The self-propelled electronic device of the invention is configured such that the urging force of the resilient member is applied to the drive wheel unit so that the pressing force, which is exerted perpendicularly to the straight line connecting the first shaft center and the second shaft center toward the outer peripheral direction of the drive wheel from the first shaft center, is exerted further toward the front side in the traveling direction than toward the gravity direction of the housing.

With the configuration, performance of the self-propelled electronic device for climbing over a level difference is improved.

DESCRIPTION OF EMBODIMENTS

Embodiment 1

Figure 1:
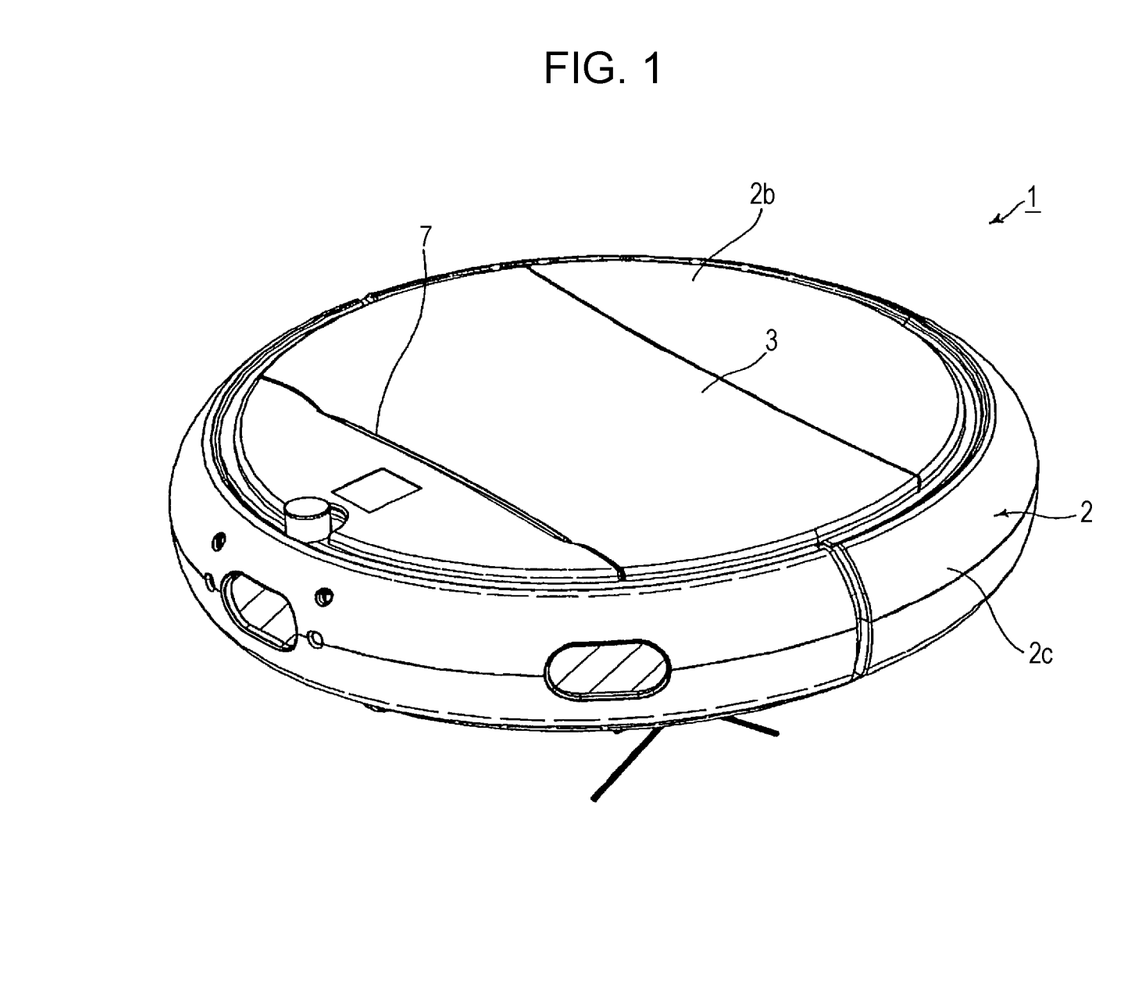
FIG. 1 is a perspective view of a self-propelled electronic device according to an embodiment 1 of the invention.
Figure 2:
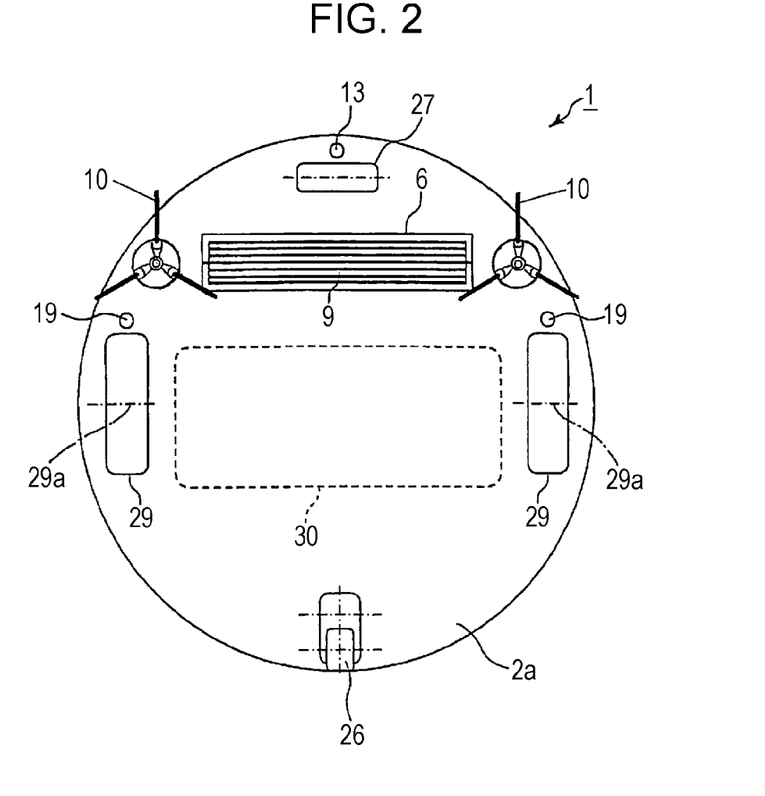
FIG. 2 is a bottom view of the self-propelled electronic device illustrated in FIG. 1.
Figure 3:
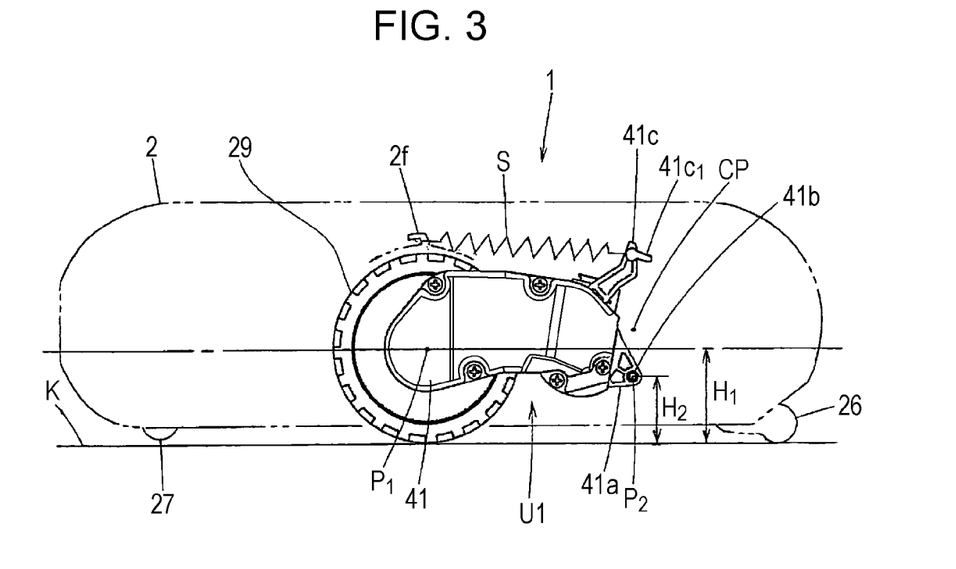
FIG. 3 is a view for explaining arrangement of a drive wheel unit in the self-propelled electronic device of the embodiment 1.
Figure 4:
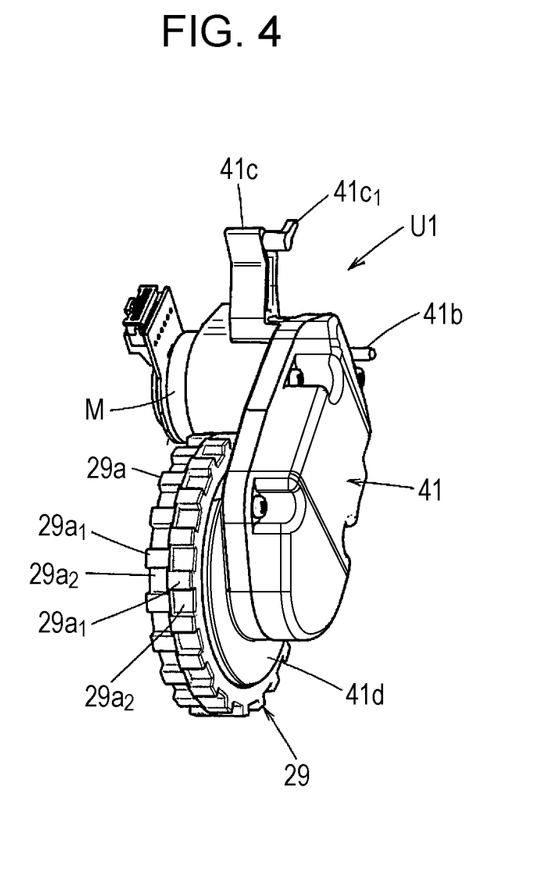
FIG. 4 is a perspective view of the drive wheel unit in the embodiment 1.

FIG. 1 is a perspective view of a self-propelled electronic device according to an embodiment 1 of the invention, FIG. 2 is a bottom view of the self-propelled electronic device illustrated in FIG. 1, FIG. 3 is a view for explaining arrangement of a drive wheel unit in the self-propelled electronic device of the embodiment 1, and FIG. 4 is a perspective view of the drive wheel unit in the embodiment 1.

In the embodiment 1, exemplified is a case where a self-propelled electronic device 1 according to the invention is a self-propelled vacuum cleaner which cleans a floor surface by sucking air including dust on the floor surface and exhausting air from which the dust has been removed, while autonomously traveling on the floor surface where the self-propelled electronic device 1 is placed.

The self-propelled electronic device 1 is provided with a disk-shaped housing 2, and components of a rotary brush 9, auxiliary brushes 10, a dust collection box 30, an electric air blower (not shown), a pair of right and left drive wheels 29, a rear wheel 26, a front wheel 27, a control portion including floor surface detection sensors 13 and 19, and the like are provided inside and outside of the housing 2. The self-propelled electronic device 1 has a feature of a structure of drive wheel units U1 provided with the drive wheels 29, and the feature will be described in detail after describing an entire configuration of the self-propelled electronic device 1.

In the self-propelled electronic device 1, a part in which the front wheel 27 is arranged is a front-side portion, a part in which the rear wheel 26 is arranged is a rear-side portion, and a part in which the dust collection box 30 is arranged is a middle portion, and three wheels of the pair of right and left drive wheels 29 and the rear wheel 26 support the housing 2 at a time of stopping and at a time of traveling on a horizontal surface. That is, the front side means a forward traveling direction of the self-propelled vacuum cleaner 1 and the rear side means a backward traveling direction thereof.

The housing 2 is provided with a bottom plate 2a, which has a round shape in plan view, having a suction port 6 formed at a position in the front-side portion near a boundary with the middle portion, a top plate 2b having, in the middle portion, a lid 3 which is openable and closable when the dust collection box 30 is put in or taken out of the housing 2, and a side plate 2c, which has a ring shape in plan view, provided along outer peripheral portions of the bottom plate 2a and the top plate 2b. In the bottom plate 2a, a plurality of holes through which lower portions of the front wheel 27, the pair of right and left drive wheels 29, and the rear wheel 26 project outside from an inside of the housing 2 are formed, and an exhaust port 7 is formed near the boundary between the front-side portion and the middle portion in the top plate 2b. Note that, the side plate 2c is divided into two of front and rear, and the front portion of the side plate functions as a bumper.

In the inside of the housing 2, a front-side storage chamber for storing a not-shown motor unit, the electric air blower, an ion generation apparatus, and the like is provided at the front-side portion, a middle storage chamber for storing the dust collection box 30 is provided at the middle portion, a rear-side storage chamber for storing a control board of the control portion which is not shown, a battery, a charging terminal, and the like is provided at the rear-side portion, and a suction path and an exhaust path are provided near the boundary between the front-side portion and the middle portion. Accordingly, in the self-propelled vacuum cleaner 1 according to the present embodiment, a center of gravity thereof exists further toward a rear side than a first shaft center of the drive wheels 29, which will be described below.

The suction port 6 is an open surface of a concave formed in a bottom surface of the housing 2 (a lower surface of the bottom plate 2a) so as to face a floor surface. Inside the concave, a rotary brush 9 which rotates around a rotary shaft center parallel to the bottom surface of the housing 2 is provided, and in both of right and left sides of the concave, auxiliary brushes 10 which rotate around rotary shaft centers perpendicular to the bottom surface of the housing 2 are provided. The rotary brush 9 is formed of brushes erected in a spiral manner on an outer peripheral surface of a roller which is a rotary shaft. Each of the auxiliary brushes 10 is formed by providing a brush bundle at a lower end of the rotary shaft in a radial manner. The rotary shaft of the rotary brush 9 and the rotary shafts of a pair of the auxiliary brushes 10 are pivoted to a part of the bottom plate 2a of the housing 2 and independently coupled to a motor unit provided in a vicinity thereof via a power transmission mechanism including a pulley, a belt, and the like.

The self-propelled electronic device 1 advances when the right and left drive wheels 29 rotate normally in a same direction, retreats when rotating reversely in a same direction, and turns when rotating in directions opposite to each other. For example, in the case of arriving at a periphery of a cleaning area and in the case of colliding with an obstruction on a course, the self-propelled electronic device 1 causes the drive wheels 29 to stop and the right and left drive wheels 29 to rotate in directions opposite to each other to change orientation. Thereby, the self-propelled electronic device 1 is able to autonomously travel across the whole of an area where the self-propelled electronic device 1 is placed or over an entire desired range while avoiding obstructions.

<Drive Wheel Unit and Attachment Structure Thereof>

Each aforementioned drive wheel unit U1 has the aforementioned drive wheel 29, and a drive wheel holder 41 which holds the drive wheel 29 so as to be rotatable around a first shaft center $P_1$.

The drive wheel 29 has a not-shown wheel portion which sets the aforementioned first shaft center $P_1$ as a center thereof, and a tire portion 29a which is attached to an outer periphery of the wheel portion. The tire portion 29a has a plurality of rectangular convexes $29a_1$ and a plurality of concaves $29a_2$ in an outer periphery thereof, and has a round shape when viewed from a direction of the first shaft center $P_1$. That is, the tire 29a is formed in such a manner that two tires in which the rectangular convexes $29a_1$ and the concaves $29a_2$ are alternately arrayed in a circumferential direction are prepared and stuck together such that, next to the rectangular convexes $29a_1$ of one tire, the concaves $29a_2$ of the other tire are positioned. At this time, since there is no gap, nick, notch, or the like between the rectangular convexes $29a_1$ of the one tire and the rectangular convexes $29a_1$ of the other tire which is adjacent thereto, the tire portion 29a has a round shape when viewed from the direction of the first shaft center $P_1$.

The drive wheel holder 41 is attached to the housing 2 so as to be rotatable around a second shaft center $P_2$ parallel to the first shaft center $P_1$.

More specifically, the drive wheel holder 41 is a gear case which has a gear inside thereof and is substantially in a shape of a shoe sole in side view, and has a front portion in which the first shaft center $P_1$ is arranged and a rear portion in which the second shaft center $P_2$ is arranged, and has a rearward projecting piece 41a and a pivotal shaft 41b serving as the second shaft center $P_2$ in the rear portion. Furthermore, the drive wheel holder 41 has a motor M, which is normally and reversely rotatable, attached to an inner surface of the rear portion, and is configured so that a rotating force of the motor M is transmitted to the drive wheel 29 via a gear and a not-shown drive shaft which is on the first shaft center $P_1$. In addition, a wheel cover portion 41d which covers the wheel portion of the drive wheel 29 is provided in an inner surface of the front portion of the drive wheel holder 41.

The pivotal shaft 41b is pivoted to a rib inside the housing 2 so as to be rotatable such that the first shaft center $P_1$ is arranged at an approximately middle position of a length in a front and rear direction of the housing 2 and the second shaft center $P_2$ is arranged further toward the rear side than the first shaft center $P_1$. At this time, a height $H_2$ of the second shaft center $P_2$ from a floor surface K is set to be lower than a height $H_1$ of the first shaft center $P_1$ in a state where the drive wheel 29 is in contact with the floor surface K.

Note that, in FIG. 3, a reference sign CP indicates a third horizontal shaft center as a comparative example, which is set at a position higher than the height $H_1$ of the first shaft center $P_1$ from the floor surface K in a state where the drive wheel 29 is in contact with the floor surface K.

Moreover, the drive wheel holder 41 has a protruding portion 41c which is drawn toward the first shaft center $P_1$ by a resilient member S (for example, a tension spring) at a position higher than the height $H_2$ of the second shaft center $P_2$ from the floor surface K in a state where the drive wheel 29 is in contact with the floor surface K and at a position above the second shaft center $P_2$. Note that, the protruding portion 41c has a hook portion $41c_1$ at an upper end thereof.

In the case of the embodiment 1, a tension spring is used as the resilient member S, a rear end of the resilient member S is hooked on the aforementioned hook portion $41c_1$, and the rear end of the resilient member S is hooked on a hook portion 2f of a drive wheel cover 2e provided inside the housing 2.

Figure 5:
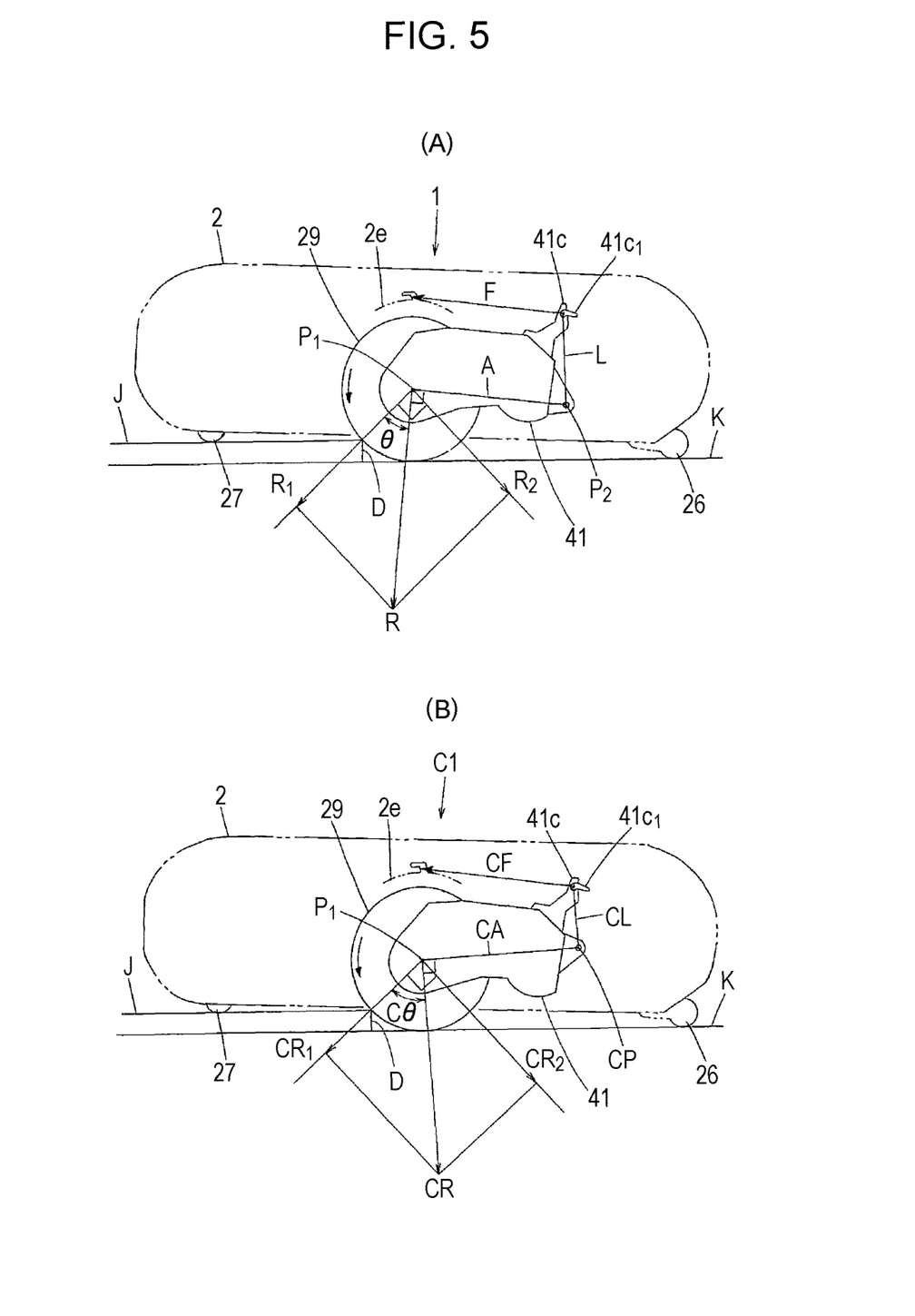
FIG. 5 is a view for explaining performance of the self-propelled electronic device for climbing over a level difference, in which (A) illustrates the embodiment 1 and (B) illustrates a comparative example.

FIG. 5 is a view for explaining performance of the self-propelled electronic device for climbing over a level difference, in which (A) illustrates the embodiment 1 and (B) illustrates the comparative example.

According to the self-propelled electronic device 1 of the embodiment 1 configured as described above, as illustrated in FIG. 3 and FIG. 5(A), when the drive wheel 29 tries to climb over a level difference D between the floor surface K and a floor covering J laid on the floor surface K, the front wheel 27 runs over the level difference D first. Thereby, the housing 2 is supported by the front wheel 27 and the rear wheel 26. Note that, instead of the front wheel 27, a projecting portion which has a sloped surface in sliding contact with a corner of the level difference D for climbing over may be provided in the bottom surface of the housing 2, or the bottom surface may be in sliding contact with the corner of the level difference D (not shown in the figure). In such a case, when the self-propelled electronic device 1 climbs over the level difference D, the housing 2 is supported by the aforementioned projecting portion or bottom surface of the housing, and the rear wheel 26.

In such a state, the drive wheel 29 of the drive wheel unit U1 is not pressed against the floor surface K by the weight of the housing 2 but pressed by an urging force of the resilient member S. That is, by an urging force F of the resilient member S, the drive wheel unit U1 is pressed against the floor surface K with the second shaft center $P_2$ as a fulcrum. At this time, the drive wheel 29 is pressed against the floor surface K with a pressing force R which is in a direction orthogonal to a line A connecting the second shaft center $P_2$ and the first shaft center $P_1$.

The pressing force R is expressed as a resultant force of a first component force $R_1$ for climbing over the level difference D and a second component force $R_2$ which is in a direction orthogonal to the first component force $R_1$. In addition, the first component force $R_1$ is expressed as a component force on a line connecting a contact point of the drive wheel 29 and the corner of the level difference D with the second shaft center $P_1$.

In the case of the comparative example illustrated in FIG. 5(B), a height of a second shaft center CP is set to be higher than the height $H_1$ of the first shaft center $P_1$ (refer to FIG. 3). Other components in the comparative example are the same as those of the self-propelled electronic device 1 of the invention.

In the case of the comparative example, the drive wheel 29 is pressed against the floor surface K with a pressing force CR which is in a direction orthogonal to a line CA connecting the second shaft center CP with the first shaft center $P_1$. The pressing force CR is equivalent to the pressing force R in the embodiment 1 of FIG. 5(A) and is expressed as a resultant force of a first component force $CR_1$ for climbing over the level difference D and a second component force $CR_2$ which is in a direction orthogonal to the first component force $CR_1$. In addition, the first component force $CR_1$ is expressed as a component force on a line connecting a contact point of the drive wheel 29 and the corner of the level difference D with the second shaft center CP.

The pressing forces R and CR are determined as appropriate by considering maximum values Rmax and CRmax of the pressing forces R and CR, with which the self-propelled electronic device 1 is not raised in a state where the self-propelled electronic device 1 is placed on the floor surface K as in FIG. 3, and variations of the urging force F of the resilient member S.

When comparing the embodiment 1 (FIG. 5(A)) and the comparative example (FIG. 5(B)), the following difference is found.

In the case of the embodiment 1, since the line A ascends slightly from the second shaft center $P_2$ toward the first shaft center $P_1$, the direction of the pressing force R is inclined slightly to the front side from a direction perpendicular to the floor surface K. Meanwhile, in the case of the comparative example, since the line CA descends slightly from the second shaft center CP toward the first shaft center $P_1$, the direction of the pressing force CR is inclined slightly to the rear side from the direction perpendicular to the floor surface K.

Here, $\theta$ and $C\theta$ illustrated in FIGS. 5(A) and (B) are set as $$\theta < C\theta.$$

As described above, in a case where the weight of the self-propelled electronic device 1 and the variations of the urging force F of the resilient member S are at almost the same degree, the urging force F and an urging force CF are adjusted so that R and CR are set as $$R = CR.$$

Accordingly, $$R_1 = R\cos(\theta) > CR\cos(C\theta) = CR_1$$

is provided, and $R_1 > CR_1$ is established.

Accordingly, it is found that the first component force $R_1$ of the embodiment 1, which is the pressing force of the drive wheel 29 against the corner of the level difference D, is larger than the first component force $CR_1$ of the comparative example.

When a dynamic friction coefficient between the drive wheel 29 and the corner of the level difference D is $\mu$ and dynamic friction forces are $F_f$ and $CF_f$, $$F_f = \mu R_1 > \mu CR_1 = CF_f$$

is provided, and $F_f > CF_f$ is established. That is, when being compared, the friction force with respect to the corner of the level difference D of the embodiment 1 is larger than that of the comparative example, so that it can be said that the embodiment 1 has better performance for climbing over a level difference than that of the comparative example.

As described above, in order to increase the first component force $R_1$, which is the pressing force of the drive wheel 29 against the corner of the level difference D, and improve the performance for climbing over a level difference, the self-propelled electronic device 1 of the invention illustrated in FIG. 5(A) is configured such that the height $H_2$ of the second shaft center $P_2$ is set to be lower than the height $H_1$ of the first shaft center $P_1$, and the urging force F of the resilient member S is applied at a position above the second shaft center $P_2$ in the drive wheel unit U1.

Note that, since a line of action L connecting the second shaft center $P_2$ and the hook portion $41c_1$ in the embodiment 1 is longer than a line of action CL connecting the second shaft center CP and the hook portion $41c_1$ in the comparative example, in the embodiment 1, it is possible to reduce the urging force F of the resilient member S (tension spring) compared to that of the comparative example in order to obtain the pressing forces R and CR at almost the same degree. That is, when components of the urging forces F and CF of the resilient member S (tension spring), which is in a direction tangent to a circle having the second shaft center $P_2$ as a center thereof are $F_R$ and $CF_R$, due to balance of moments, $$A \times R = L \times F_R \text{ and}$$

$$CA \times CR = CL \times CF_R,$$

are provided, and moreover, since A=CA and R=CR are provided, $$L \times F_R = CL \times CF_R$$

is provided, and when L>CL, $F_R < CF_R$ is established. Here, when the urging force F of the resilient member S (tension spring) is close to the direction tangent to the circle having the second shaft center $P_2$ as the center thereof, it is possible to approximate to $F = F_R$ and $CF = CF_R$. Accordingly, $$F < CF$$

is provided. In this manner, it is possible to reduce the urging force F of the resilient member S (tension spring), thus making it possible to reduce the size of a spring and improve workability at a time of attachment.

Embodiment 2

According to the present embodiment, even in a case where the center of gravity of the self-propelled electronic device 1 is further toward the rear side than the first shaft center $P_1$ of the drive wheel 29, it is possible to improve the performance of the drive wheel 29 for climbing over a level difference. That is, in a case where the center of gravity of the self-propelled vacuum cleaner 1 is further toward the rear side than the first shaft center $P_1$ of the drive wheel 29, even when the drive wheel 29 reaches the corner of the level difference D and a side of the housing 2, which is further toward a front side than the drive wheel 29, climbs over the level difference D, a side of the housing 2, which is in the rear side where the center of gravity still remains, does not climb over the level difference D, so that it is strongly required to improve the performance for climbing over a level difference by the drive wheel 29. As described above, according to the present embodiment, even in a case where the center of gravity of the self-propelled electronic device 1 is further toward the rear side than the first shaft center $P_1$ of the drive wheel 29, it is possible to improve the performance of the drive wheel 29 for climbing over a level difference, so that flexibility of a layout of an inside of the housing 2 is improved. However, also in a case where the center of gravity of the self-propelled electronic device 1 is further toward the front side than the first shaft center $P_1$ of the drive wheel 29, according to the present embodiment, the performance for climbing over a level difference is similarly improved.

Embodiment 3

Figure 6:
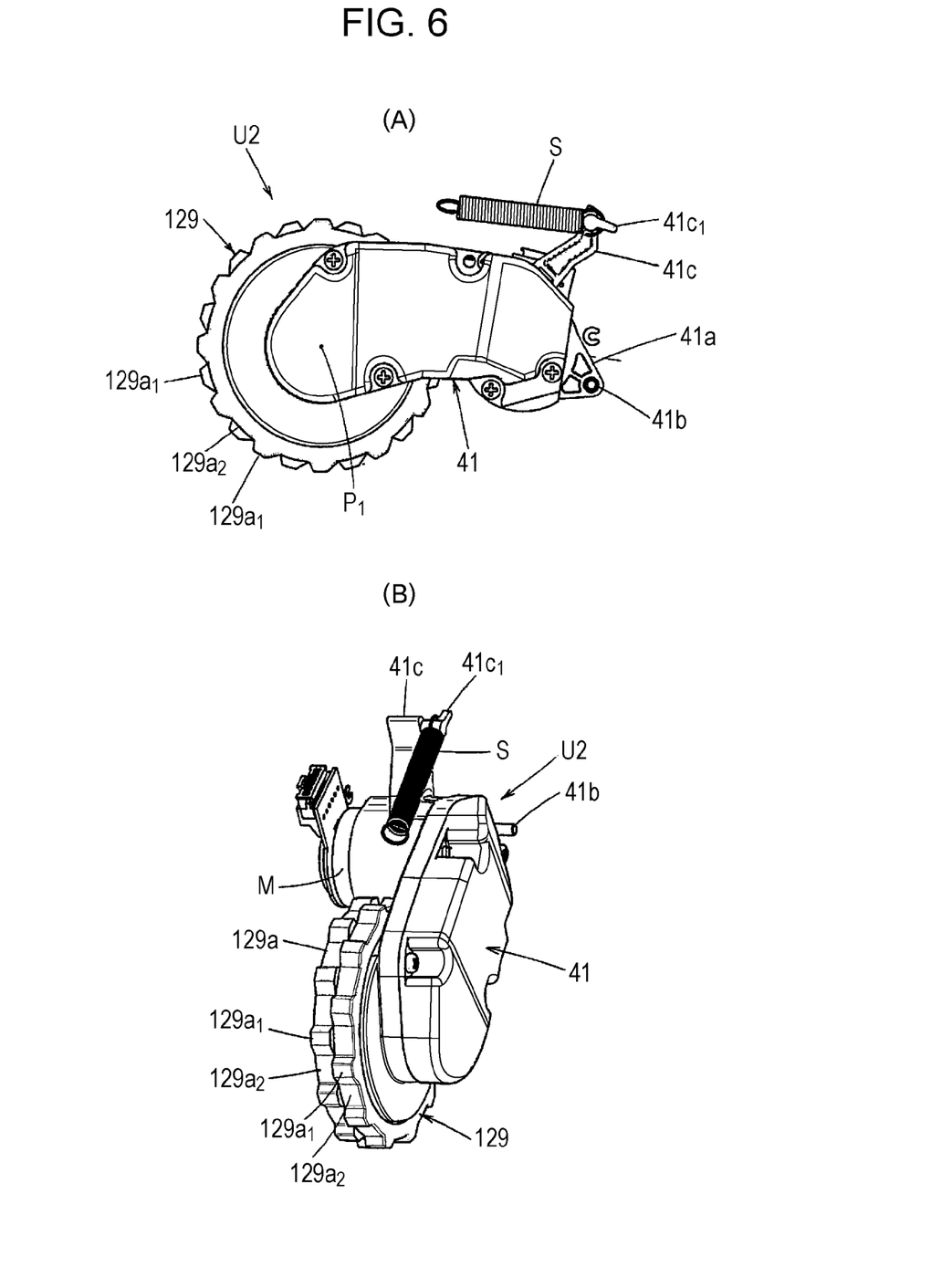
FIG. 6 illustrates a drive wheel unit U2 in an embodiment 2, in which (A) is a side view and (B) is a perspective view.
Figure 7:
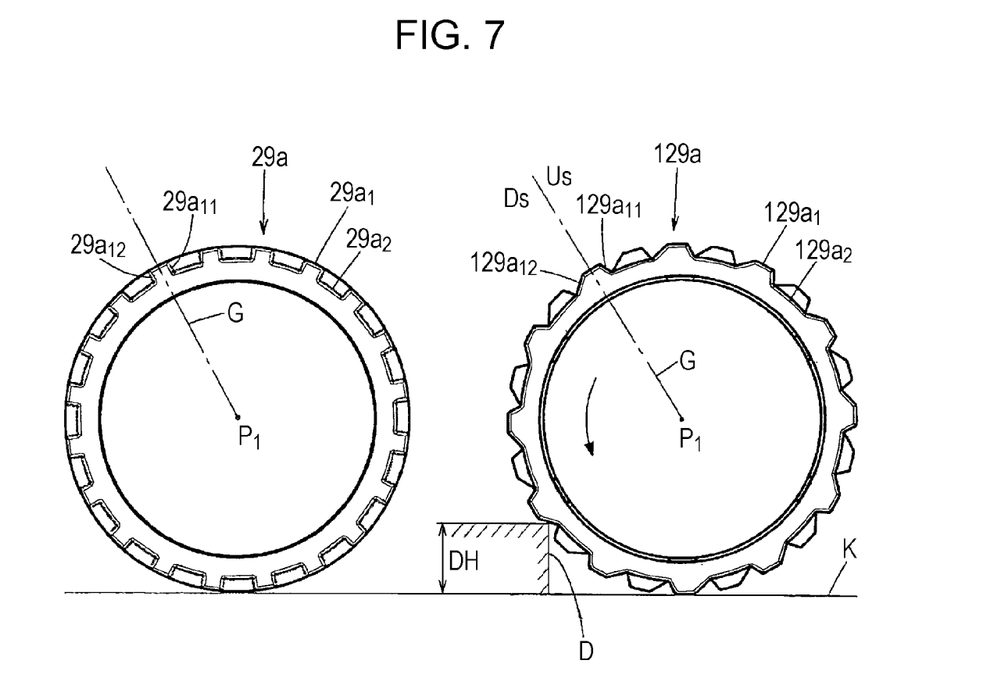
FIG. 7 is a side view for comparing outer peripheral shapes of tire portions of respective drive wheels in the embodiments 1 and 2.
Figure 8:
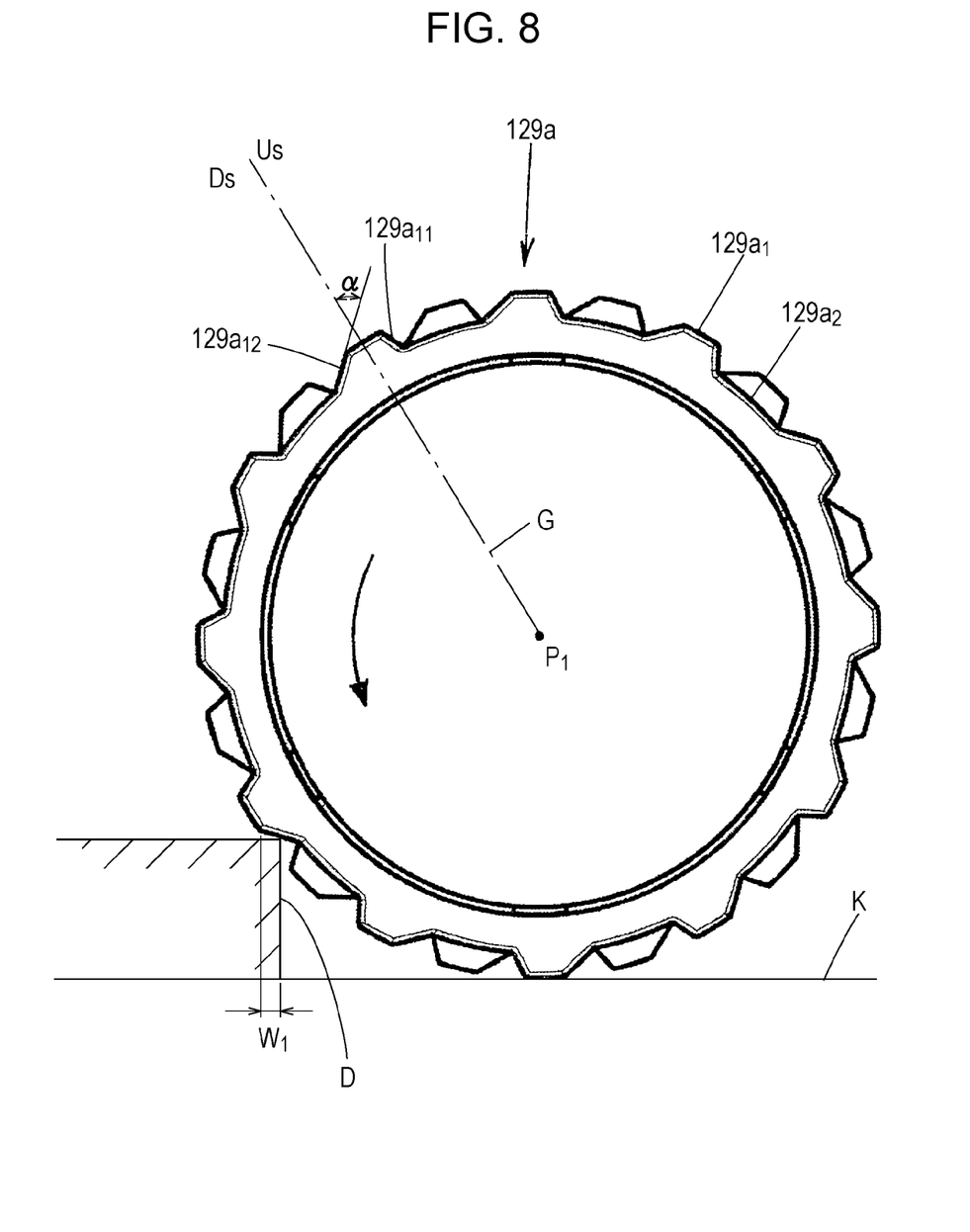
FIG. 8 is a view for explaining performance for climbing over a level difference by a trapezoidal convex of the tire portion, which has a large inclination angle, in the embodiment 2.
Figure 9:
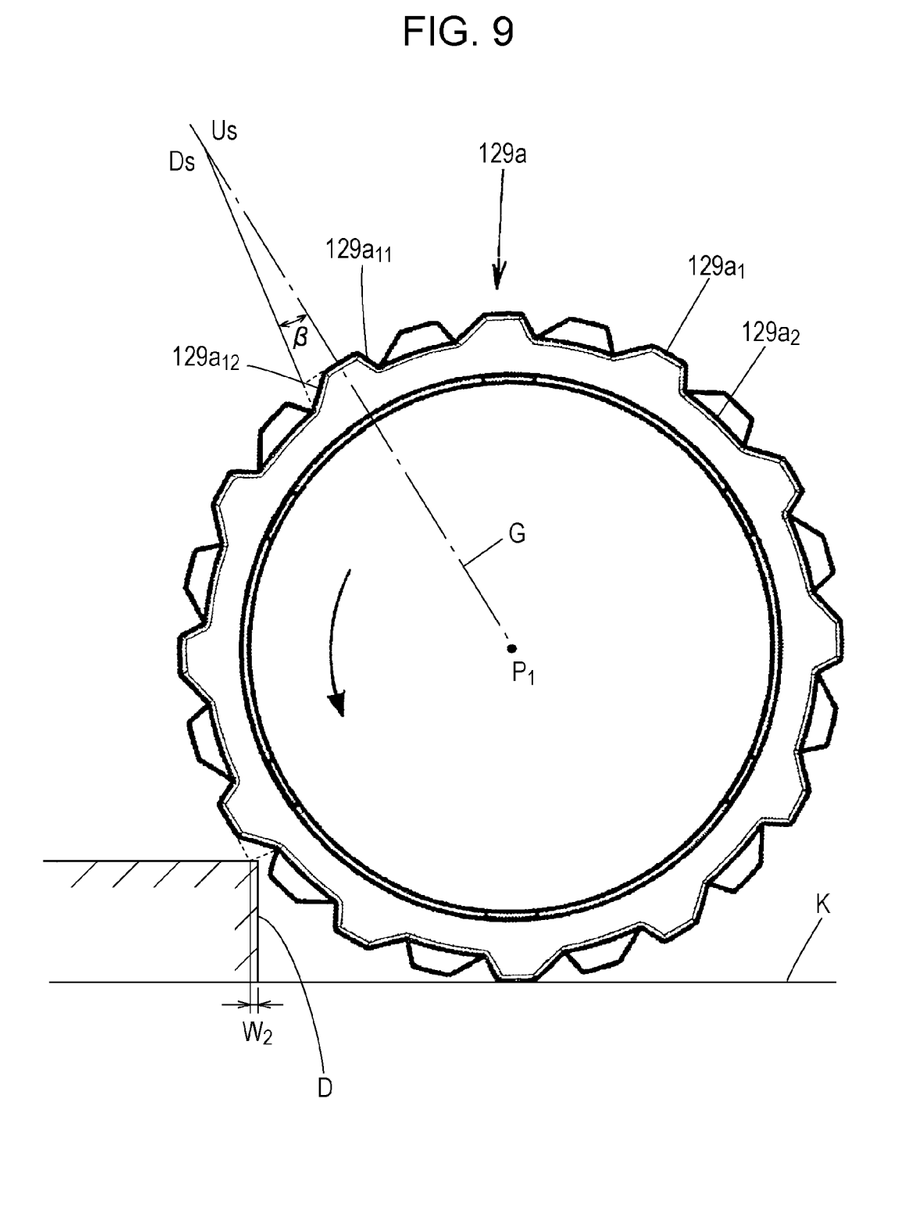
FIG. 9 is a view for explaining performance for climbing over a level difference by a trapezoidal convex of the tire portion, which has a small inclination angle.

FIG. 6 illustrates a drive wheel unit U2 in the embodiment 2, in which (A) is a side view and (B) is a perspective view. FIG. 7 is a side view for comparing outer peripheral shapes of tire portions of respective drive wheels in the embodiments 1 and 2. FIG. 8 is a view for explaining performance for climbing over a level difference by a trapezoidal convex of the tire portion, which has a large inclination angle, in the embodiment 2, and FIG. 9 is a view for explaining performance for climbing over a level difference by a trapezoidal convex of the tire portion, which has a small inclination angle. Note that, in FIGS. 6(A) and (B), the same reference signs are assigned to elements similar to elements in FIGS. 3 and 4.

The embodiment 2 is different from the embodiment 1 only in a drive wheel 129 of the drive wheel unit U2, and other configuration in the embodiment 2 is similar to that of the embodiment 1.

More specifically, the drive wheel 129 has a not-shown wheel portion and a tire portion 129a which is attached to an outer periphery of the wheel portion. The tire portion 129a has a plurality of trapezoidal convexes $129a_1$ and a plurality of concaves $129a_2$ in an outer periphery thereof, and has the outer periphery with a concave-convex shape when viewed from a direction of the first shaft center $P_1$.

That is, the tire 129a is formed in such a manner that two tires in which the trapezoidal convexes $129a_1$ and the concaves $129a_2$ are alternately arrayed in a circumferential direction are prepared and stuck together such that, next to the trapezoidal convexes $129a_1$ of one tire, the concaves $129a_2$ of the other tire are positioned. At this time, since there is a V-shaped gap between the trapezoidal convex $129a_1$ of the one tire and the trapezoidal convex $129a_1$ of the other tire which is adjacent thereto, the tire portion 129a has the outer periphery with the concave-convex shape when viewed from the direction of the first shaft center $P_1$.

Further, the trapezoidal convex $129a_1$ of the tire portion 129a has an upstream-side inclination surface $129a_{11}$ in, with a radial line G from the first shaft center $P_1$ as a boundary, an upstream side Us when the tire portion 129a rotates in a forward traveling direction (direction of an arrow), and has a downstream-side inclination surface $129a_{12}$ in a downstream side Ds.

With respect to the radial line G, the downstream-side inclination surface $129a_{12}$ is set to have an inclination angle larger than that of the upstream-side inclination surface $129a_{11}$. In other words, the upstream-side inclination surface $129a_{11}$ is set close to being parallel to the radial line G as compared to the downstream-side inclination surface $129a_{12}$.

Meanwhile, the rectangular convex $29a_1$ of the tire portion 29a of the embodiment 1 has perpendicular surfaces $29a_{11}$ and $29a_{12}$, which are substantially parallel to the radial line G, in both sides having the radial line G from the first shaft center $P_1$ as a boundary.

According to the self-propelled vacuum cleaner of the embodiment 2, since the tire portion 129a has the outer periphery with the concave-convex shape when viewed from the direction of the first shaft center $P_1$, the concaves and the convexes in the outer periphery of the tire portion 129a easily catches the level difference D, which enables a rotating force of the tire portion 129a to be effectively utilized for a force in a direction of running over the level difference D.

In addition, as illustrated in FIG. 8, since the downstream-side inclination surface $129a_{12}$ of the trapezoidal convex $129a_1$ of the tire portion 129a is set to have a large inclination angle α with respect to the radial line G, the rotating force of the tire portion 129a is able to be effectively used for the force in the direction of running over the level difference D. That is, a notch angle of a groove is adjusted so that the tire portion 129a is in surface (downstream-side inclination surface $129a_{12}$) contact with a top surface of the level difference D. In addition, by setting the inclination angle α to be large, a distance $W_1$ by which the trapezoidal convex 129a1 is able to be hooked on the level difference D becomes long, so that the trapezoidal convex $129a_1$ is easily hooked on the level difference D deeply. Accordingly, it is effective, for example, when the self-propelled electronic device climbs over a doorsill which has a corner part abraded to be rounded.

Meanwhile, as illustrated in FIG. 9, in a case where the downstream-side inclination surface (dotted part) of the trapezoidal convex $129a_1$ of the tire portion 129a is set to have a small inclination angle β with respect to the radial line G, since a distance $W_2$ by which the trapezoidal convex $129a_1$ is able to be hooked on the level difference D becomes short, it becomes difficult to effectively use the rotating force of the tire portion 129a for the force in the direction of running over the level difference D and it becomes difficult for the trapezoidal convex $129a_1$ to be hooked on the level difference D deeply.

Accordingly, in the self-propelled vacuum cleaner of the embodiment 2, the performance for climbing over a level difference is improved more. Note that, in the case of the embodiment 2, assumed is the case of climbing over the level difference D having a height DH of 15 to 20 mm.

Embodiment 4

Though, a case where the self-propelled electronic device 1 is the self-propelled vacuum cleaner which has a cleaning function has been exemplified in the embodiments 1 and 2, the self-propelled electronic device of the invention may be a self-propelled ion generation apparatus which has a function of generating ions.

Overview

A self-propelled electronic device of the invention includes: a housing which has a bottom plate; a pair of right and left drive wheel units which support the housing; and a resilient member which resiliently urges the drive wheel units in a direction to project toward a lower side from the bottom plate, each of the drive wheel units having a drive wheel and a drive wheel holder which holds the drive wheel to be rotatable around a first shaft center, in which the drive wheel holder is attached to the housing so as to be rotatable around a second shaft center which is arranged further toward a rear side than the first shaft center and which is parallel to the first shaft center, and an urging force of the resilient member is applied to the drive wheel units such that a pressing force, which is exerted in a direction perpendicular to a straight line connecting the first shaft center and the second shaft center toward an outer periphery of the drive wheel from the first shaft center, is exerted further toward a front side in a traveling direction than toward a gravity direction of the housing.

The self-propelled electronic device of the invention may have following configurations which may be combined as appropriate.

(1) In a state where the drive wheel is in contact with a floor surface, a height of the second shaft center from the floor surface may be set to be lower than a height of the first shaft center.

In such a configuration, compared to a case where the height of the second shaft center from the floor surface is set to be higher than the height of the first shaft center, and the urging force of the resilient member is applied to a position above the second shaft center in the drive wheel units, a force with which the drive wheel presses a corner of a level difference while traveling forward increases, so that performance of the self-propelled electronic device for climbing over a level difference is improved. This effect of the invention is effective particularly in a case where a center of gravity of the self-propelled electronic device is in a rear portion thereof.

(2) The drive wheel holder may have, in a position above the second shaft center, a protruding portion to which the resilient member is attached and which is drawn toward the first shaft center.

This provides an advantage that it is possible to arrange the resilient member in a space inside the housing, where the drive wheel units are arranged.

(3) The drive wheel may have an outer periphery with a concave-convex shape when viewed from a direction of the first shaft center.

Since it becomes easy for concaves and convexes of the outer periphery of the drive wheel to be hooked on the level difference, frictional resistance between the drive wheel and the level difference increases, so that the performance of the self-propelled electronic device for climbing over a level difference is improved more.

(4) The self-propelled electronic device may be a self-propelled electronic device which has a cleaning function or a self-propelled ion generation apparatus which has a function of generating ions.

Accordingly, it is possible to obtain the self-propelled electronic device or the self-propelled ion generation apparatus of which performance for climbing over a level difference is improved.

Note that, the disclosed embodiments are to be considered in all respects only as illustrative and not restrictive. The scope of the invention is indicated by the scope of Claims rather than the above-described description, and intended is that changes within the meaning and range of equivalency of scope of the Claims are included.

REFERENCE SIGNS LIST 1 self-propelled electronic device
2 housing
2a bottom plate
29, 129 drive wheel
41 drive wheel holder
41c protruding portion
$H_1$, $H_2$ height
K floor surface
$P_1$ first shaft center
$P_2$ second shaft center
S resilient member
U drive wheel unit

The invention claimed is:

1. A self-propelled electronic device, comprising:
a housing which has a bottom plate;
a pair of right and left drive wheel units which support the housing; and
a resilient member which resiliently urges the drive wheel units in a direction to project toward a lower side from the bottom plate,
each of the drive wheel units having a drive wheel and a drive wheel holder which holds the drive wheel to be rotatable around a first shaft center, wherein
the drive wheel holder is attached to the housing so as to be rotatable around a second shaft center which is arranged further toward a rear side than the first shaft center and which is parallel to the first shaft center, and
an urging force of the resilient member is applied to the drive wheel units such that a pressing force, which is exerted in a direction perpendicular to a straight line connecting the first shaft center and the second shaft center toward an outer periphery of the drive wheel from the first shaft center, is exerted further toward a front side in a traveling direction than toward a gravity direction of the housing.

2. The self-propelled electronic device according to claim 1, wherein in a state where the drive wheel is in contact with a floor surface, a height of the second shaft center from the floor surface is set to be lower than a height of the first shaft center.

3. The self-propelled electronic device according to claim 1, wherein the drive wheel holder has, in a position above the second shaft center, a protruding portion to which the resilient member is attached and which is drawn toward the first shaft center.

4. The self-propelled electronic device according to claim 1, wherein the drive wheel has an outer periphery with a concave-convex shape when viewed from a direction of the first shaft center.

5. The self-propelled electronic device according to claim 1, wherein the self-propelled electronic device is a self-propelled vacuum cleaner which has a cleaning function or a self-propelled ion generation apparatus which has a function of generating ions.

* * * * *